May 14, 1968 P. O. BOBO 3,383,575
EXCITATION SYSTEMS
Filed Jan. 7, 1966 2 Sheets-Sheet 1

WITNESSES:

INVENTOR
Powell O. Bobo
BY
ATTORNEY ated May 14, 1968

3,383,575
EXCITATION SYSTEMS
Powell O. Bobo, Pittsburgh, Pa., assignor to Westinghouse Electric Corporation, Pittsburgh, Pa., a corporation of Pennsylvania
Filed Jan. 7, 1966, Ser. No. 519,223
5 Claims. (Cl. 318—179)

This invention relates in general to excitation systems for electrical motors, and more specifically to excitation systems for electrical motors of the synchronous type.

In many applications of synchronous motors, the motor is intermittently loaded, with sudden and severe torque demands being placed upon the motor for relatively short periods of time. If the motor is continuously excited with a constant magnitude of excitation current, sufficient to supply the high torques without danger of pulling the synchronous motor out of synchronism, rotor heating is considerable. Thus, a larger motor would be required than if the motor would be supplied with a high magnitude of excitation current only when it is actually being loaded. If the excitation system is load responsive, increasing the magnitude of the excitation current during loading of the motor, the system must be extremely fast acting and the magnitude of the excitation current must be increased as quickly as possible, to supply the torque demanded without pulling the motor out of synchronism. Since a smaller rated, less costly motor may be used with a load responsive excitation system, it would be desirable to provide a fast acting excitation system that will quickly provide a large magnitude of excitation current in response to motor load.

In addition to providing an excitation system which is load responsive, it would be desirable to provide an excitation system which is responsive to a predetermined electrical quantity of the electrical system to which the motor is electrically connected, to regulate the predetermined quantity of the excitation system in response to that quantity when the motor is not being subjected to the intermittent high torque load. For example, the excitation current of the motor may be regulated in response to the power factor, or in response to the voltage of the electrical power system, in an effort to regulate those particular electrical quantities of the overall electrical system.

Thus, it would be desirable to provide an excitation system for synchronous motors which are subjected to intermittent loads, such that the system will provide the excitation current necessary to deliver the torque demanded of it while loaded, and which will provide the excitation current necessary to regulate a predetermined electrical quantity of the electrical power system, when unloaded.

Accordingly, it is an object of the invention to provide a new and improved excitation system for synchronous motors.

A further object of the invention is to provide a new and improved excitation system for synchronous motors which are subjected to intermittent loads, which allows a smaller rated motor to be used.

Another object of the invention is to provide a new and improved excitation system for synchronous motors which is load responsive when the motor is loaded, and responsive to a predetermined electrical quantity of the electrical power system connected to the motor, when the motor is substantially unloaded.

Still another object of the invention is to provide a new and improved excitation system for synchronous motors which enables a synchronous motor to respond to intermittent high torque demands without pulling out of synchronism, and which regulates a predetermined electrical quantity of the electrical power system connected to the motor, when the motor is not being subjected to the high torque demands.

Briefly, the present invention accomplishes the above-cited objects by providing an excitation system for synchronous motors which includes first and second regulator means. The first regulator means is a power factor regulator connected to the synchronous motor, and the second regulator means is connected to regulate a predetermined electrical quantity of the electrical power system. The two regulators are connected to the field winding of the synchronous motor through auctioneering means and control means, with the larger of the signals from the two regulators being applied to the control means, which in turn controls the magnitude of the current flowing through the field winding from a source of unidirectional potential. Thus, when the synchronous motor is subjected to a load, the power factor regulator on the synchronous motor provides a signal which usually exceeds the magnitude of the signal from the second regulator, increasing the excitation of the synchronous motor to provide the torque necessary to prevent the motor from being pulled out of synchronism. When the synchronous motor is substantially unloaded, the signal from the second regulator will exceed the signal from the first regulator, and the excitation applied to the synchronous motor will be responsive to the electrical quantity of the electrical power system to be regulated.

Further objects and advantages of the invention will become apparent from the following detailed description, taken in connection with the accompanying drawings, in which.

Figure 1:
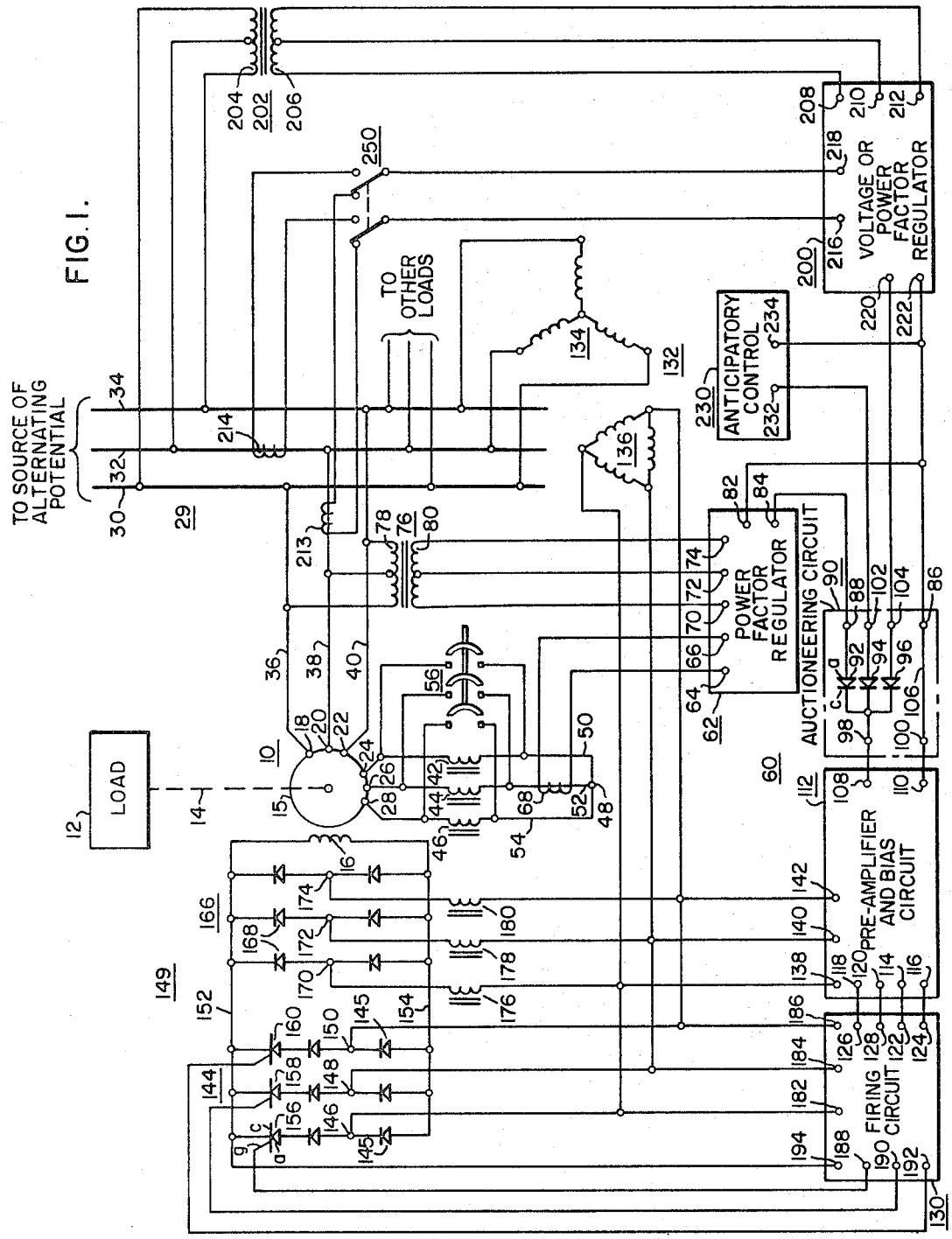
FIGURE 1 is a schematic diagram, partially in block form, illustrating an excitation system for synchronous motors which embodies the teachings of the invention.

A sudden load on a synchronous motor momentarily slows the rotor, changing the mechanical phase angle of the rotor to the point necessary to develop the torque demanded by the load. The change in mechanical phase angle changes the electrical angle between the generated EMF of the motor and the voltage applied to the motor terminals by the electrical power system, causing the armature current to be adjusted in magnitude and phase until the power input to the motor is sufficient to provide the required power element.

There is a maximum mechanical phase angle which must not be exceeded if the motor is to remain in synchronism. If a motor cannot sustain load torque at its new mechanical phase angle after an increase in load, it will drop out of step. The ability of a synchronous motor to stay in synchronism under load transients is a prime consideration in selecting the size of a synchronous motor and its excitation system.

In many applications of synchronous motors, the motor is intermittently loaded, being subjected to sudden high torque demands for relatively short periods of time, and is substantially unloaded for the intervening periods of time. An example of this type of loading is a steel mill drive, where rapid and severe torque demands are made upon the motor when a heated billet is introduced into the driven rolls, and the motor is substantially unloaded when the driven rolls are empty.

Advantage may be taken of the duty cycle of these intermittently loaded synchronous motors to reduce the rating of the motor. However, the hereinbefore mentioned factor of synchronism pullout must also be considered.

The mechanical phase angle excursion of a synchronous motor may be reduced for any given applied load, by increasing the direct current excitation current flowing through the field winding of the synchronous motor, as the torque demand occurs. Thus, a load responsive excitation system may be used to extend the usefulness of a given synchronous motor, by increasing the momentary load torque capability of the motor as the motor is loaded. A load responsive excitation system may increase the load torque capability of a synchronous motor by as much as three times rated full load torque.

The excitation current required by the intermittent peak torque must not be sustained during periods of substantially no load, as heating of the rotor would occur which would require a larger rated motor. In fact, the excitation system would be selected to provide the lowest average excitation current, thus keeping rotor heating to a minimum and allowing the smallest rated motor to be utilized.

In addition to taking advantage of the intermittent loading of some synchronous motor applications to reduce the motor size, and still provide high momentary torques by using a load responsive excitation system, it would be desirable to take advantage of the unloaded intervals of time to regulate an electrical quantity, such as power factor or voltage, of the electrical power system to which the synchronous motor is connected. This may be accomplished by controlling the excitation current of the synchronous motor during these unloaded intervals in response to the electrical quantity of the electrical power system to be regulated.

FIG. 1 illustrates a schematic diagram of circuits and apparatus which will automatically respond to load on the synchronous motor to provide the excitation current necessary for the motor to withstand sudden and severe load torques without pulling out of synchronism, and which will automatically provide excitation current to the motor in response to a predetermined electrical quantity of the electrical power system connected to the motor, when the motor is substantially unloaded.

In general, FIG. 1 illustrates a synchronous motor 10 connected to a load 12 through suitable mechanical coupling means 14. The synchronous motor 10 includes an armature 15 having electrical terminals 18, 20, 22, 24, 26 and 28, and a field winding 16. Terminals 18, 20 and 22 are connected to a three phase electrical power system 29, represented by electrical conductors 30, 32 and 34, through conductors 36, 38 and 40, respectively. Terminals 24, 26 and 28 are connected to one side of starting reactors 42, 44 and 46, respectively. The other sides of starting reactors 42, 44 and 46 are connected in common at point 48, through conductors 50, 52 and 54, respectively. The starting reactors 42, 44 and 46 are bypassed by breaker 56 once motor 10 is started, in a manner well known in the art.

Synchronous motor 10 includes an excitation system 60 which is load responsive when synchronous motor 10 is loaded, and which is responsive to a predetermined electrical quantity of electrical power system 29 when the motor 10 is substantially unloaded.

Figure 2:
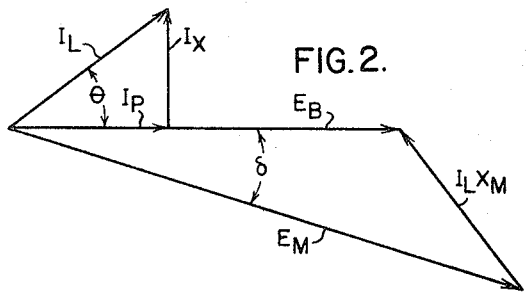
FIGS. 2, 3 and 4 are vector diagrams explanatory of the operation of a portion of the circuit shown in FIG. 1.

Power factor regulation is the most effective method of varying synchronous motor excitation current in response to load. The reason for this may be more readily understood by studying the vector diagrams shown in FIGS. 2, 3 and 4. FIG. 2 illustrates a steady-state vector diagram of a synchronous motor, such as synchronous motor 10, in which $E_B$ is the voltage applied to the armature terminals 18, 20 and 22 by the electrical power system 29, and $E_M$ is the internal voltage produced by the synchronous motor 10, which is established by the excitation current in the field winding 16. The angle delta ($\delta$) between $E_B$ and $E_M$ represents the mechanical phase angle of the rotor, and the internal voltage drop in the motor $I_L X_M$, is the product of the motor line current $I_L$ and the reactance of the motor $X_M$. The internal voltage drop is also the difference between the internal motor voltage $E_M$ and the voltage $E_B$ applied to the motor terminals, as shown in FIG. 2, and this internal voltage drop leads the line current $I_L$ by 90 degrees. The line current $I_L$ is the vector sum of the power component $I_P$ and the reactive component $I_X$. The angle theta ($\theta$) is the electrical phase angle of the machine, and the power factor is cos ($\theta$) or $I_P/I_L$.

Figure 3:
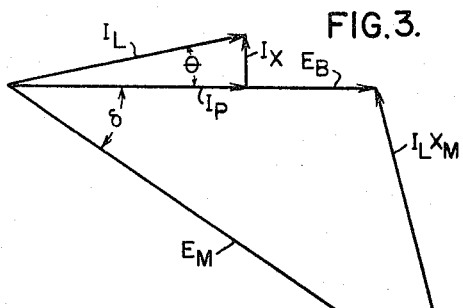

If the load on the motor 10 is increased, and a power factor regulator is not used, the new steady-state conditions will be those shown in FIG. 3. The voltage $E_B$ of the electrical power system and the internal motor voltage $E_M$ can be assumed to remain unchanged in magnitude. The internal voltage $E_M$ follows the motor mechanical phase angle delta ($\delta$) to a new position, larger than in FIG. 2 due to the load increase. The power component $I_P$ of the line current $I_L$ increases due to the increased load. As a result, the electrical phase angle theta goes less leading and the reactive component $I_X$ of the line current reduces in magnitude. For greater increases in load, the phase angle can go lagging, as will the reactive component $I_X$. The excitation current and hence the internal motor voltage $E_M$ remains unchanged. Thus, the motor is limited in the maximum torque that it can supply, without being pulled out of step or synchronism.

Figure 4:
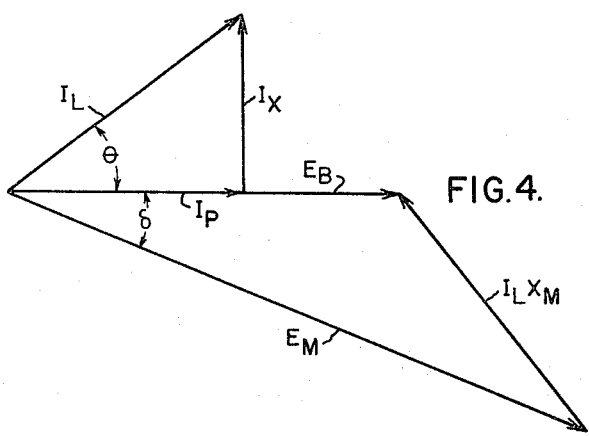

FIG. 4 illustrates what occurs when the power factor of the motor 10 is regulated. Thus, FIG. 4 illustrates the condition where the power factor shown in FIG. 2 is maintained under the load conditions shown in FIG. 3. The angle theta remains unchanged in FIGS. 2 and 4. The line current increases in response to the new load conditions. The internal voltage drop $I_L X_M$ also increases, and the angle of the internal voltage drop $I_L X_M$ remains the same as in FIG. 2, as it is perpendicular to the line current $I_L$. Therefore, the generated voltage $E_M$ of the motor 10 must increase, requiring an increase in the motor excitation current. Thus, when the load increases and tends to make the power factor of the motor less leading, the power factor regulator increases the motor excitation current to retain the predetermined angle to be regulated. It will be noted from FIG. 4 that while the mechanical phase angle delta is greater than in FIG. 2, that it is not as great as in FIG. 3. This indicates that larger torques may be sustained by a motor under power factor regulation, than by a motor without such regulation.

Power factor regulation of the motor also contributes to regulation of the electrical power system 29, stabilizing the motor terminal voltage under variable load conditions due to the fact that the motor furnishes leading wattless vars to counteract the lagging wattless vars of the inductive transmission lines of the electrical power system 29.

Load responsive excitation of synchronous motor 10 by power factor control may be accomplished as shown in FIG. 1, by a power factor regulator 62, which provides a unidirectional error signal having a magnitude and polarity responsive to the deviation of the motor power factor from the desired regulated value. A power factor regulator which may be used for the power factor regulator 62 is shown and described in copending application Serial No. 509,359, filed Nov. 23, 1965 by W. H. South, and assigned to the same assignee as the present application.

Power factor regulator 62 has input terminals 64 and 66 for receiving a signal responsive to the line or armature current of motor 10. A current transformer 68 may be disposed in inductive relation with one of the conductors 50, 52 and 54, such as conductor 52 as shown, or in inductive relation with one of the conductors 36, 38 and 40, and connected to terminals 64 and 66 of power factor regulator 62 to supply intelligence responsive to the current of synchronous motor 10.

Power factor regulator 62 has input terminals 70, 72 and 74 for receiving a signal responsive to the voltage applied to the armature terminals 18, 20 and 22 from the electrical power system 29. A potential transformer 76 having a primary winding 78 connected to conductors 36, 38 and 40 and a secondary winding 80 connected to input terminals 70, 72 and 74 of power factor regulator 62, may be used to supply the intelligence responsive to voltage.

Power factor regulator 62 has output terminals 82 and 84 for providing a unidirectional error signal whose magnitude and polarity reflect any deviation of the actual motor power factor from the desired value.

The error signal from terminals 82 and 84 of power factor regulator 62 is applied to input terminals 86 and 88 of auctioneering means 90.

Auctioneering means 90, whose full purpose will be hereinafter explained, includes a plurality of asymmetrically conductive devices, such as diodes 92, 94 and 96, each having an anode and cathode electrode, $a$ and $c$, respectively. The cathode electrodes $c$ are connected in common to output terminal 98, and the anode electrodes $a$ of diodes 92, 94 and 96 are connected to input terminals 88, 102, and 104, respectively. Input terminal 86 of auctioneering means and output terminal 100 are connected together via conductor 106.

Ignoring for the moment any other input signals to auctioneering means 90, the error signal from power factor regulator 62 will be applied to output terminals 98 and 100 of auctioneering means 90. The output signal from auctioneering means 90 is used to control the excitation current flowing in field winding 16 from a source of unidirectional potential, by applying the output signal from auctioneering means 90 to an appropriate control means. The source of unidirectional potential and the control means for controlling the magnitude of the field current may take one of many forms well known in the art. For example, as shown in FIG. 1, the source of unidirectional potential may be a transformer 132 connected to the electrical power system 29 and a rectifier bridge arrangement 149. The control means for controlling the magnitude of current flowing in field rectifier 16 may be a firing circuit as shown at 130, and a preamplifier and bias circuit for amplifying the signal from auctioneering means 90 and supplying the direct current bias required for operation of the preamplifier and firing circuits.

More specifically, as shown in FIG. 1, output terminals 98 and 100 of auctioneering means 90 are connected to input terminals 108 and 110 of the preamplifier and bias circuit 112. The preamplifier and bias circuit 112 amplifies the signal from auctioneering means 90 and provides a bias potential for use in the firing circuit 130. The amplified signal from auctioneering means 90 appears at output terminals 114 and 116 of preamplifier and bias circuit 112, and the bias potential appears at output terminals 118 and 120.

The electrical potential for operating the preamplifier and bias circuit 112 may be provided by the power potential transformer 132, which has a primary winding 134 connected to conductors 30, 32 and 34 of the electrical power system 29, and a secondary winding 136 connected to input terminals 138, 140 and 142 of preamplifier and bias circuit 112.

The amplified signal from the preamplifier and bias circuit 112 is applied to input terminals 122 and 124 of the firing circuit 130, and the bias potential provided by the preamplifier and bias circuit 112 is applied to terminals 126 and 128 of firing circuit 130.

Firing circuit 130 controls the average direct current excitation applied to the field winding 16 by the rectifier circuit 149. The rectifier circuit 149 may include two three-phase bridge type rectifiers 144 and 166, respectively, with bridge rectifier 166 being arranged to provide a predetermined portion of the total excitation requirements. Bridge rectifier 144 is then arranged to provide a variable additional portion of the excitation supply in response to the output signal of auctioneering means 90.

If it is not desirable to provide a base excitation supply, bridge rectifier 166 could be eliminated, with the complete excitation requirement being supplied by bridge rectifier 144.

Bridge rectifier 144 has input terminals 146, 148 and 150 connected to the secondary winding 136 of power potential transformer 132, and its output conductors 152 and 154 are connected to the field winding 16 of synchronous motor 10. Rectifier bridge arrangement 144 includes three legs, each having asymmetrically conductive devices, such as diodes 145. Each leg of the bridge rectifier 144 also includes a controllable switching device, such as controlled rectifiers 156, 158 and 160, which each include a cathode electrode $c$, anode electrode $a$, and a gate electrode $g$. The firing time of the controlled rectifiers 156, 158 and 160 determines the average unidirectional excitation potential applied to field winding 16 by the bridge arrangement 144.

Bridge rectifier arrangement 166 also includes a plurality of asymmetrically conductive devices, such as diodes 168, and it has input terminals 170, 172 and 174 connected to the secondary winding 136 of power potential transformer 132. The output of bridge rectifier arrangement 166 is connected to conductors 152 and 154. In order to prevent the output of the two bridge circuit arrangements 144 and 166 from auctioneering, and thus blocking the output of the rectifier having the lower potential output, bridge rectifier 166 is connected to secondary winding 136 of transformer 132 through linear reactors 176, 178 and 180, which give the appearance of a current rather than a voltage source.

In order to synchronize the firing circuit 130 with the alternating potential applied to bridge rectifier arrangement 144, the secondary winding 136 of transformer 132 is connected to the firing circuit 130 at input terminals 182, 184 and 186. The firing pulses for the gate electrodes $g$ of control rectifiers 156, 158 and 160 are provided at output terminals 188, 190 and 192, respectively. Terminal 194 is the common output for terminals 188, 190 and 192, and is connected to the cathode electrode $c$ of controlled rectifiers 156, 158 and 160.

United States Patent 3,211,987 issued Oct. 12, 1965, and assigned to the same assignee as the present application, includes a detailed description of a preamplifier and bias circuit 112 and firing circuit 130 that may be used.

Thus, when the load on the synchronous motor 10 is increased, the power factor of the synchronous motor tends to change in the lagging direction. The power factor regulator 62 provides an error signal which causes the firing circuit to fire the controlled rectifiers earlier in the voltage half cycle, thus increasing the magnitude of excitation current flowing in the field winding 16. The increased magnitude of the excitation current increases the internal voltage of the synchronous motor 10 to the point necessary to maintain the desired predetermined power factor. A reduction in load on the synchronous motor 10 has the reverse effect, tending to make the motor power factor more leading. The power factor regulator 62 applies an error signal to firing circuit 130 which fires the controlled rectifiers 156, 158 and 160 later in the voltage half cycle, reducing the magnitude of excitation current flowing in the field winding 16, which reduces the internal voltage of the synchronous motor 10 to the point necessary to maintain the predetermined power factor.

As hereinbefore stated, load control of the excitation current is only necessary while the motor 10 is loaded. During the intervals of time that the motor 10 is substantially unloaded, it would be desirable to regulate the excitation of the motor 10 in response to some electrical quantity of the electrical power system 29, providing leading wattless vars to the electrical power system to improve the power factor of the electrical power system 29 and add stability to the voltage of the system. This may be accomplished by a regulator 200 which is responsive to the predetermined electrical quantity of the system. For example, the regulator 200 may be a voltage regulator. Thus, the excitation of the synchronous motor 10 would be adjusted to maintain the voltage of the electrical power system 29 at a predetermined magnitude. Or, the regulator 200 may be a power factor regulator similar to the power factor regulator 62. In this event, the excitation of the motor 10 would be adjusted to maintain the power factor of the electrical power system 29 at a predetermined value. If the regulator 200 is a voltage regulator, it may obtain intelligence responsive to the voltage of the electrical power system 29 through potential transformer 202, which has a primary winding 204 connected to conductors 30, 32 and 34 of the electrical power system 29, and a secondary winding 206 connected to input terminals 208, 210 and 212 of voltage regulator 200.

In order to modify the voltage regulator output signal in response to the load on the electrical system, in order to insure that motors operating in parallel will share reactive loading, a current transformer 213 disposed in inductive relation with one of the conductors 36, 38 and 40, such as conductor 38 shown, may be used to apply a signal to input terminals 216 and 218 of voltage regulator 200 responsive to the armature current of synchronous motor 10, or current transformer 213 may be disposed in inductive relation with conductor 52, or the output of current transformer 68 may be used. A voltage regulator including a droop compensator circuit which may be used is shown and described in detail in the hereinbefore mentioned U.S. Patent 3,211,987.

The error signal developed by regulator 200 is provided at its output terminals 220 and 222. Output terminals 220 and 222 are connected to input terminals 104 and 86, respectively of auctioneering means 90.

Now, auctioneering means 90 has two input signals, a signal from the power factor regulator 62, which is responsive to the power factor of the synchronous motor 10, and a signal from the voltage regulator 200, which is responsive to the voltage of the electrical power system 29. The magnitude of the error signals are adjusted such that when the motor 10 is substantially unloaded, the signal from regulator 200 will be larger than the signal from power factor regulator 62. Thus, the smaller signal will be blocked by auctioneering means 90, allowing the larger signal from regulator 200 to control the excitation of the motor 10. When the motor 10 is subjected to a sudden severe load, its power factor will tend to change markedly, and power factor regulator 62 will provide an error signal of large magnitude, which exceeds that provided by the regulator 200. Thus, the signal from regulator 200 will be blocked, and the signal from the power factor regulator 62 will control the excitation of the motor 10.

If the regulator 200 is a power factor regulator, similar to power factor regulator 62, similar external connections would be made as already described when describing the regulator 200 as a voltage regulator, except the current signal, used for var compensation in the case of the voltage regulator, must now be obtained from a location which will provide a signal responsive to the angle of the total current of the electrical power system 29. For example, a current transformer 214 disposed in inductive relation with one of the main power conductors, such as conductor 32, may be used. Switching means 250, such as a double pole-double throw switch, is shown connected between the regulator 200 and current transformers 213 and 214 to indicate the change required for the different types of regulators which may be used for regulator 200. If regulator 200 is a voltage regulator with var compensation, the switching means would be in the position shown in FIG. 1. If regulator 200 is a power factor regulator, switching means 250 would be switched to connect regulator 200 with current transformer 214. In actual practice, switching means 250 would not be required, as once the type of regulation for the electrical system 29 is established, only current transformer 213 or 214 would be used, not both.

To always auctioneer the larger of the signals applied to it, positive or negative, terminal 108 of preamplifier and bias circuit 112 may be connected to a negative potential of predetermined magnitude through a suitable resistor. Thus, the largest signal relative to the negative potential would be allowed to pass through the auctioneering circuit 90. The voltage drop across the resistor would be the signal which would be amplified and applied to the firing circuit.

The desired objective of obtaining field stiffening as torque demands are made on the synchronous motor 10, may be further supplemented by employing anticipatory means, such as shown at 230. Anticipatory means or control 230 may take any of several different approaches. For example, where the load is a steel billet, the approach of the hot billet to the rolls may be signified before reaching the rolls by an infrared detector, or photocell, which causes the anticipatory control 230 to provide a unidirectional signal of predetermined magnitude for a predetermined period of time at its output terminals 232 and 234. The output signal from anticipatory control 230 is applied to terminals 102 and 86 of auctioneering means 90, and it is designed to have a signal magnitude which is larger than the magnitude of the signals from either the power factor regulator 62 or the regulator 200. Thus, the signal from anticipatory control 230 is auctioneered through the auctioneering circuit 90, which causes the firing circuit 130 to switch early in the voltage half cycle and provide maximum excitation current to the field winding 16 for a predetermined period of time. By the time the signal from anticipatory control 230 ceases, the motor 10 will be loaded and the error signal from power factor regulator 62 will control the excitation of the motor 10.

The anticipatory means may also be in the form of a rate of rise detector, which may be included in the power factor regulator 62. When the rate of rise of the power input to the synchronous motor 10 reaches a predetermined magnitude, the signal output of the power factor regulator may be augmented by the rate of rise detector. It is based upon the logic that a high rate of rise of input power to the synchronous motor 10 is a forecast of a large error, and therefore, the regulator should provide a large error signal before the predicted error becomes a reality.

Figure 5:
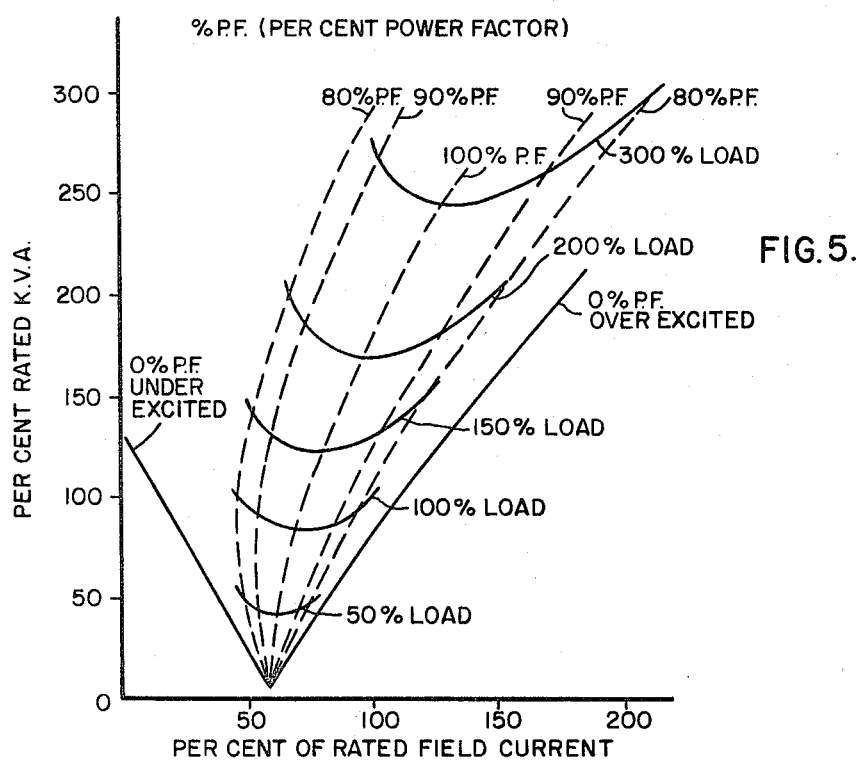
FIG. 5 is a graph illustrating the relationship of field excitation current, power factor, and load, relative to a synchronous motor.

FIG. 5 illustrates the typical V curves of a synchronous motor, and is included to illustrate how the excitation current increases with load for any given power factor. Percent rated kva. is plotted on the ordinate and percent rated field current is plotted on the abscissa. The solid lines indicate the relationship of field current to kva. for various levels of load. The dotted curves, called compounding curves, are drawn through points of constant power factor, and illustrate how the excitation current is required to increase in order to hold the power factor constant as the load increases.

The V curves are useful in determining the amount of excitation current to be supplied by the base excitation rectifier 166. A base excitation current is usually provided for the zero percent load, unity power factor point, which is approximately 60% of rated field current in the example shown in FIG. 5. For example, if a maximum load of 300% at unity power factor is to be handled, the base excitation supplied by rectifier means 166 will be 60% of the rated field current, and rectifier means 144 will have to be capable of supplying an additional 65% of rated field current.

In summary, there has been disclosed a new and improved excitation system for synchronous motors, which takes advantage of the intermittent loading of many synchronous motor applications to accomplish a plurality of desirable objectives. The disclosed system allows a smaller rated motor to be used by supplying large excitation currents only when required by the motor. Thus, rotor heating is minimized, making it possible to use a smaller motor. The increase of excitation current with load reduces the mechanical angle excursion of the rotor for a particular load torque, making it possible for a given motor rating to provide large momentary torques without danger of pulling out of synchronism, which further aids the use of a smaller rated motor. Further, when the motor is not loaded, its excitation current is adjusted according to some predetermined electrical quantity of the electrical power system connected to the motor, which takes advantage of the power factor correction and voltage stabilizing characteristics of a synchronous motor to regulate the predetermined electrical quantity of the electrical power system.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. An excitation system comprising a synchronous motor having a field winding and input terminals, a source of alternating potential connected to the input terminals of said synchronous motor, a source of direct current potential connected to said field winding, control means connected in circuit relation with said source of direct current potential and said field winding, first regulator means connected in circuit relation with said synchronous motor and providing a first signal responsive to the deviation of the electrical power factor of said synchronous motor from a predetermined value, second regulator means connected in circuit relation with said source of alternating potential and providing a second signal responsive to the deviation of a predetermined electrical quantity from a predetermined value, auctioneering means connected in circuit relation with said first and second regulator means and said control means, said auctioneering means applying the larger of the first and second signals to said control means, said control means controlling the magnitude of current flowing in said field winding in response to the signal applied thereto by said auctioneering means, said first signal being larger than said second signal when the load on said synchronous motor reaches a predetermined magnitude, and the second signal being larger than the first signal when the load on the synchronous motor is below the predetermined magnitude.

2. The excitation system of claim 1 wherein said second regulator means is a power factor regulator, and the second signal is responsive to the deviation of the power factor of said source of alternating potential from a predetermined value.

3. The excitation system of claim 1 wherein said second regulator means is a voltage regulator and the second signal is responsive to the deviation of the voltage of said source of alternating potential from a predetermined value.

4. The excitation system of claim 1 including anticipatory means responsive to the rate of rise of power input to said synchronous motor to increase the magnitude of said first signal.

5. The excitation system of claim 1 including anticipatory means connected in circuit relation with said auctioneering means which anticipates when said synchronous motor will be loaded, said anticipatory means providing a third signal for a predetermined period of time, prior to the loading of said synchronous motor, whose magnitude exceeds that of said first and second signals.

References Cited

UNITED STATES PATENTS

| | | | |
|---|---|---|---|
| 3,100,279 | 8/1963 | Rohner | 318—167 |
| 3,350,613 | 10/1967 | Brockman et al. | 318—176 |

ORIS L. RADER, *Primary Examiner.*

G. Z. RUBINSON, *Assistant Examiner.*